UNITED STATES PATENT OFFICE 2,688,554

PROCESS OF PREPARING STABILIZED PEANUT BUTTER

Fitzhugh L. Avera, Alameda, Calif.

No Drawing. Application December 23, 1950,
Serial No. 202,573

37 Claims. (Cl. 99—128)

The invention, in general, relates to the production of stabilized peanut butter and more particularly relates to an improved method of providing a soft and easily spreadable stabilized peanut butter of increased palatability and flavor.

The present application is a continuation-in-part of my co-pending application, entitled Stabilized Peanut Butter, Serial Number 81,021, filed March 11, 1949, now Letters Patent No. 2,552,925.

Those skilled in the art of manufacturing stabilized peanut butters heretofore have devoted their attention, in the main, to achieving stability as a function of the confluent network of the so-termed stabilizing ingredients which act to retain the liquid constituents in gravitational suspension. That is to say, stabilization of peanut butters by prior methods has largely involved the incorporation into a peanut butter mass of an oil, fat or wax-like structure, which is solid or semi-solid at normal ambient temperatures, to provide the aforementioned confluent network of stabilizer or gel structure in which are dispersed the liquid oil constituents.

A primary object of the present invention is to provide an improvement in processing stabilized peanut butters wherein the usual congealed structure achieved by the incorporation of stabilizing ingredients is confined within each of a plurality of discrete, disassociated units; each unit being in and of itself intra-confluent and retaining the stable characteristics of stabilized peanut butter while the aggregate of the units does not evidence the usual general confluency of stabilized peanut butter but affords an end product characterized by unique quasi-fluidity, increased spreadability and softness.

Another important object of the present improvement is to afford a unique process of the indicated nature which is additionally characterized by the application of thermal techniques to a peanut butter mass containing stabilizing ingredients and subjecting the same to disruptive agitation to control crystalline formations.

Other objects of the invention, together with some of the advantageous features thereof, will appear from the following description of preferred modes of carrying out the process as well as modified modes of preparing the end product. It is to be understood, however, that I am not to be limited to the precise methods herein described, nor to the precise order of steps set forth, as my invention, as defined in the appended claims, can be carried out in a plurality and variety of ways.

It is to be understood that when the term disruptive agitation is used herein, such term includes agitation by milling, slicing, cutting, subdividing or subsonic, sonic, supersonic or ultrasonic vibrations.

The term "plastic range" is used herein to denote the thermal boundaries beyond which the general plasticity of a substance is no longer exhibited. With respect to stabilized peanut butter specifically, the plastic range is evidenced by temperatures below which the general fat structure crystallizes and congeals, as the one boundary, and different higher temperatures above which the fat structure liquefy and melt as the other boundary. As is well known to those skilled in the art, the plastic range of different stabilized peanut butters varies, since the glyceride structures present in stabilized peanut butter exhibit dual or multiple congealing and melting points due to polymorphic or metastable fat crystalline forms which, per se, have multiple congealing and melting points.

Preferred modes of practicing my improved process include, in one instance, following the initial steps of preparing a mass of comminuted peanuts containing a stabilizing ingredient, reducing the temperature of the mass to bring the temperature thereof below the lowest temperature of the plastic range of said mass and subjecting the mass to disruptive agitation, and then allowing or causing the temperature of the mass to rise to a value in proximity to but below the highest temperature of the plastic range of the mass and continuing disruptive agitation thereof thereby affording a stabilized peanut butter composed of a plurality of discrete, disassociated units, the aggregate of which exhibits unique quasi-fluidity, softness and spreadability throughout a relatively wide range of temperatures.

In another instance, the initial steps are followed of removing a portion or all of the natural peanut oil from a quantity of roasted and blanched peanuts and preparing with the residue a stabilized peanut butter mass comprising comminuted peanut solids, natural peanut oil and stabilizer together with the usual flavoring agents such as salt and sugar, thereafter reducing the temperature of the mass to bring the temperature of the mass below the lowest temperature of the plastic range thereof, and subjecting the mass to disruptive agitation without allowing the temperature to rise during such agitation, and thereafter transferring the mass to a final marketing container.

A modification of the first stated mode comprises providing a mass of stabilized peanut butter, transferring the mass to a final marketing container, subjecting the mass while in the said container to heat exchange to reduce the temperature from that acquired in the production of the mass to a temperature below the lowest temperature of its plastic range and subjecting the mass in said container to disruptive agitation until a withdrawn sample thereof shows no further rise in temperature indicating substantial major fat crystallization at the temperature of withdrawal, and thereafter subjecting the contained mass to further heat exchange causing the temperature to rise in value in proximity to but below the highest temperature of the plastic range of the contained mass and continuing disruptive agitation of the contained mass until a sample of the mass withdrawn while the temperature thereof is within the plastic range thereof shows no further temperature rise thus indicating substantial completion of the total fat crystallization of the end product at all temperatures below the upper limit of the plastic range.

A modification of the second stated mode comprises following the initial steps of preparing a mass of comminuted peanuts containing stabilizing ingredients, transferring the mass to a final marketing container, subjecting the mass while in the said container to heat exchange to reduce the temperature from that acquired in the production of the mass to a temperature below the lowest temperature of its plastic range, and subjecting the mass to disruptive agitation until a withdrawn sample shows no temperature rise above the temperature of withdrawal thus indicating substantial completion of the total fat crystallization of the end product at all temperatures below the lower limit of the plastic range.

In practicing my improved process, the usual steps of preparing a comminuted mass of peanut butter, including roasting and blanching a quantity of shelled peanuts, may be followed. Thereafter, the peanuts are ground or comminuted in conventional grinding mills or comminuting equipment. To the comminuted mass, a peanut butter stabilizer may be added by melting the same and introducing the stabilizer into the mass during or after the comminuting operation. Preferably, I employ a hydrogenated vegetable oil, which may be an hydrogenated natural peanut oil, which itself has a predetermined plastic range. With such stabilizer contained in the comminuted mass of peanut butter, the stabilized peanut butter mass exhibits a related but different predetermined plastir range. As an example, utilizing a peanut butter stabilizer having a predetermined plastic range between two different temperatures of higher and lower values and introducing the same in an amount of approximately 6%, by weight, to the comminuted mass of peanut butter, the stabilized peanut butter mass will exhibit a plastic range between two related but different temperatures of higher and lower values but in each case of lower value than the higher and lower values exhibited by the peanut butter stabilizer.

In accordance with my improved thermal techniques and with reference to the above delineated first instance of my preferred modes of preparing my improved stabilized peanut butter, I cause the stabilized peanut butter mass of the example just cited to be reduced in temperature from the temperature acquired in the production of the comminuted mass to a temperature below the lowest temperature of the plastic range thereof, such as to a temperature of approximately 100° F. This reduction in temperature, or super-cooling, of the stabilized peanut butter mass is preferably accomplished with heat exchangers, simultaneously or subsequently, the mass is subjected to disruptive agitation. The disruptive agitation of the mass is continued until no further temperature rise is observed in a withdrawn sample thereof, which indicates the first major crystallization in the crystalline stage of the mass. Thereafter, disruptive agitation of the mass is continued with further subjection of the mass to the action of heat exchangers to cause the temperature of the mass to rise to a value close to but below the highest temperature of its plastic range, or to a temperature approximately 108° F. to 110° F. The disruptive agitation is continued until no further increase in temperature is observed in a withdrawn sample of the mass, and thereafter the stabilized peanut butter or end product is transferred to final marketing containers. The thermal techniques above set forth afford an end product of stabilized peanut butter which is composed of a plurality of discrete, disassociated units; the aggregate of such units exhibiting unique quasi-fluidity, softness and spreadability over a wide range of temperatures.

It is to be understood, of course, that the reference hereinabove to utilizing an hydrogenated vegetable oil, as a stabilizer, which in itself has a plastic range between 134° F. and 148° F. is solely by way of example and explanatory of my present improvement. That is to say, the invention contemplates the employment of any one of a wide variety of stabilizers, including other edible oleaginous stabilizers such as a glyceride partial ester or an isomerized vegetable oil as well as a non-oleaginous stabilizer such as an edible alcohol, as exemplified by the higher alcohols, all exhibiting or having different plastic ranges at temperatures higher than normal ambient temperatures. The process, therefore, is entirely effective to produce the aforesaid efficaceous end product, utilizing a wide range of peanut butter stabilizers.

In the modification of the aforestated first instance of preferred modes of preparing the improved stabilized peanut butter, the usual steps of roasting and blanching a quantity of shelled peanuts may be followed as well as comminuting the peanuts by passing them through grinders or comminuting equipment. Thereafter, an aforementioned peanut butter stabilizer is introduced into the mass preferably during the grinding of the peanuts in order to provide a mass of stabilized peanut butter and the mass is then transferred directly into final containers for marketing. Then, the mass while in the containers is subjected to the action of heat exchangers to reduce the temperature of the mass from the temperature acquired during the production thereof to a temperature below the lowest temperature of the plastic range of the mass and simultaneously or subsequently the mass while in the containers is subjected to disruptive agitation. The disruptive agitation is carried on until a withdrawn sample shows no temperature rise thus indicating substantial major fat crystallization at the temperature of withdrawal. Thereafter, the disruptive agitation of the contents of the containers while still in the containers is continued and further subjected to heat exchangers to cause the temperature of the mass to rise in proximity to but lower than the highest temperature of the plastic range thereof, and disruptive agitation continued until a sample of the mass withdrawn while the temperature thereof is within the plastic range thereof shows no further temperature rise thus indicating substantial completion of the total fat crystallization of the end product at all temperatures below the upper limit of the plastic range.

In order to clarify my purpose in definitely setting forth four exemplifications of my improved process, designated preferred modes and modifications, it may be mentioned that definite economic commercial expediencies are involved in the choice of mode or modification. The economics and employment of different types of equipment in modern high-speed commercial production will dictate the particular choice of mode or modification delineated herein best suited to produce an end product with the requisite differentiation of the plurality of discrete, disassociated units.

It is to be understood that the appended claims are to be accorded a range of equivalents commensurate in scope with the advance made over the prior art.

I claim:

1. A process of preparing a stabilized peanut butter exhibiting quasi-fluidity, softness and spreadability over a wide range of temperatures, said process comprising the steps of providing a comminuted mass of peanuts containing a peanut butter stabilizer and having a predetermined plastic range, reducing the temperature of the mass to a temperature below the lowest temperature of the plastic range thereof while simultaneously subjecting the mass to disruptive agitation, until a withdrawn sample shows no temperature rise thus indicating substantial major fat crystallization at the temperature of withdrawal, and then causing the temperature of the mass to rise to a value in proximity to but below the highest temperature of its plastic range while continuing the disruptive agitation of the mass until a sample of the mass withdrawn while the temperature thereof is within the plastic range thereof shows no further temperature rise thus indicating substantial completion of the total fat crystallization of the end product at all temperatures below the upper limit of the plastic range.

2. A process of preparing a stabilized peanut butter exhibiting quasi-fluidity, softness and spreadability over a wide range of temperatures, said process comprising the steps of roasting, and blanching a quantity of shelled peanuts, comminuting the roasted, shelled and blanched peanuts to a plastic mass, introducing into said mass an hydrogenated edible vegetable oil having a predetermined plastic range to provide a stabilized peanut butter mass having a predetermined plastic range, then reducing the temperature of said mass to a temperature below the lowest temperature of the plastic range thereof while simultaneously subjecting the mass to disruptive agitation until a withdrawn sample shows no temperature rise thus indicating substantial major fat crystallization at the temperature of withdrawal, and then causing the temperature of the mass to rise to a value in proximity to but below the highest temperature of the plastic range thereof while continuing disruptive agitation of the mass until a sample of the mass withdrawn while the temperature thereof is within the plastic range thereof shows no further temperature rise thus indicating substantial completion of the total fat crystallization of the end product at all temperatures below the upper limit of the plastic range.

3. A process of preparing a stabilized peanut butter exhibiting quasi-fluidity, softness and spreadability over a wide temperature range, said process comprising providing a stabilized peanut butter mass having a predetermined plastic range, reducing the temperature of the mass to a temperature below the plastic range thereof and subjecting the mass to disruptive agitation until a withdrawn sample shows no temperature rise thus indicating substantial major fat crystallization at the temperature of withdrawal, and then heating the mass to a temperature in proximity to but below the higher temperature limit of its plastic range, and subjecting the mass to agitation until a sample of the mass withdrawn while the temperature thereof is within the plastic range thereof shows no further temperature rise thus indicating substantial completion of the total fat crystallization of the end product at all temperatures below the upper limit of the plastic range.

4. A process of preparing a stabilized peanut butter exhibiting quasi-fluidity, softness and spreadability over a wide range of temperatures, said process comprising the steps of providing a comminuted mass of peanuts containing a peanut butter stabilizer and having a predetermined plastic range, reducing the temperature of the mass to a temperature below the lowest temperature of the plastic range thereof, then subjecting the mass to disruptive agitation until a withdrawn sample shows no temperature rise thus indicating substantial major fat crystallization at the temperature of withdrawal, and thereafter causing the temperature of the mass to rise to a value in proximity to but below the highest temperature of its plastic range, and then continuing the disruptive agitation of the mass until a sample of the mass withdrawn while the temperature thereof is within the plastic range thereof shows no further temperature rise thus indicating substantial completion of the total fat crystallization of the end product at all temperatures below the upper limit of the plastic range.

5. A process of preparing a stabilized peanut butter exhibiting quasi-fluidity, softness and spreadability over a wide range of temperatures, said process comprising the steps of roasting and blanching a quantity of shelled peanuts, comminuting the roasted, shelled and blanched peanuts to a plastic mass, introducing into said mass an hydrogenated edible vegetable oil having a predetermined plastic range to provide a stabilized peanut butter mass having a predetermined plastic range, then reducing the temperature of said mass to a temperature below the lowest temperature of the plastic range thereof, thereafter subjecting the mass to disruptive agitation until a withdrawn sample shows no temperature rise thus indicating substantial major fat crystallization at the temperature of withdrawal, and then causing the temperature of the mass to rise to a value in proximity to but below the highest temperature of the plastic range thereof while continuing disruptive agitation of the mass until a sample of the mass withdrawn while the temperature thereof is within the plastic range thereof shows no further temperature rise thus indicating substantial completion of the total fat crystallization of the end product at all temperatures below the upper limit of the plastic range.

6. A process for preparing a stabilized peanut butter comprising providing a stabilized peanut butter mass of predetermined plastic range, reducing the temperature of the mass to bring the temperature of the mass below the lowest temperature of its plastic range, and subjecting the mass to disruptive agitation until a withdrawn sample shows no temperature rise above the temperature of withdrawal thus indicating substantial completion of the total fat crystallization of the end product at all temperatures below the lower limit of the plastic range.

7. A process of preparing a stabilized peanut butter comprising providing a stabilized peanut butter mass of predetermined plastic range, transferring said mass to a final marketing container, subjecting the mass while in said container to heat exchange to reduce the temperature thereof acquired in the production of the mass to a temperature below the lowest temperature of its plastic range and subjecting the contents of said container to disruptive agitation until a withdrawn sample shows no temperature rise thus indicating substantial major fat crystallization at the temperature of withdrawal, and thereafter raising the temperature of the contents of the container to a value in proximity to but below the highest temperature of its plastic range and then subjecting the mass to disruptive agitation until a sample of the mass withdrawn while the temperature thereof is within the plastic range thereof shows no further temperature rise thus indicating substantial completion of the total fat crystallization of the end product at all temperatures below the upper limit of the plastic range.

8. A process of preparing a stabilized peanut butter comprising providing a stabilized peanut butter mass of predetermined plastic range, transferring said mass to a final marketing container, reducing the temperature of the mass while in said container to bring the temperature of the mass below the lowest temperature of its plastic range, and subjecting the contents of the said container to disruptive agitation until a withdrawn sample shows no temperature rise above the temperature of withdrawal thus indicating substantial completion of the total fat crystallization of the end product at all temperatures below the lower limit of the plastic range.

9. A process as defined in claim 1 wherein the peanut butter stabilizer is a non-oleaginous substance having a plastic range at temperatures higher than normal ambient temperatures.

10. A process as defined in claim 1 wherein the peanut butter stabilizer is an edible alcohol having a plastic range at temperatures higher than normal ambient temperatures.

11. A process as defined in claim 3 wherein the stabilizer employed in providing the stabilized peanut butter is a non-oleaginous substance having a plastic range at temperatures higher than normal ambient temperatures.

12. A process as defined in claim 3 wherein the stabilizer employed in providing the stabilized peanut butter is an edible alcohol having a plastic range at temperatures higher than normal ambient temperatures.

13. A process as defined in claim 3 wherein the stabilizer employed in providing the stabilized peanut butter is an hydrogenated vegetable oil.

14. A process as defined in claim 4 wherein the peanut butter stabilizer is a non-oleaginous substance having a plastic range at temperatures higher than normal ambient temperatures.

15. A process as defined in claim 4 wherein the peanut butter stabilizer is an edible alcohol having a plastic range at temperatures higher than normal ambient temperatures.

16. A process as defined in claim 6 wherein the stabilizer employed in providing the stabilized peanut butter is a non-oleaginous substance having a plastic range at temperatures higher than normal ambient temperatures.

17. A process as defined in claim 6 wherein the stabilizer employed in providing the stabilized peanut butter is an edible alcohol having a plastic range at temperatures higher than normal ambient temperatures.

18. A process as defined in claim 6 wherein the stabilizer employed in providing the stabilized peanut butter is an hydrogenated vegetable oil.

19. A process as defined in claim 7 wherein the stabilizer employed in providing the stabilized peanut butter is a non-oleaginous substance having a plastic range at temperatures higher than normal ambient temperatures.

20. A process as defined in claim 7 wherein the stabilizer employed in providing the stabilized peanut butter is an edible alcohol having a plastic range at temperatures higher than normal ambient temperatures.

21. A process as defined in claim 7 wherein the stabilizer employed in providing the stabilized peanut butter is an hydrogenated vegetable oil.

22. A process as defined in claim 8 wherein the stabilizer employed in providing the stabilized peanut butter is a non-oleaginous substance having a plastic range at temperatures higher than normal ambient temperatures.

23. A process as defined in claim 8 wherein the stabilizer employed in providing the stabilized peanut butter is an edible alcohol having a plastic range at temperatures higher than normal ambient temperatures.

24. A process as defined in claim 8 wherein the stabilizer employed in providing the stabilized peanut butter is an hydrogenated vegetable oil.

25. A process as defined in claim 1 wherein the peanut butter stabilizer is an oleaginous substance having a plastic range at temperatures higher than normal ambient temperatures.

26. A process as defined in claim 6 wherein the stabilizer employed in providing the stabilized peanut butter is an oleaginous substance having a plastic range at temperatures higher than normal ambient temperatures.

27. A process as defined in claim 7 wherein the stabilizer employed in providing the stabilized peanut butter is an oleaginous substance having a plastic range at temperatures higher than normal ambient temperatures.

28. A process as defined in claim 8 wherein the stabilizer employed in providing the stabilized peanut butter is an oleaginous substance having a plastic range at temperatures higher than normal ambient temperatures.

29. A process as defined in claim 1 wherein the stabilizer employed is hydrogenated natural peanut oil.

30. A process as defined in claim 3 wherein the stabilizer employed in providing the stabilized peanut butter is an hydrogenated natural peanut oil.

31. A process as defined in claim 5 wherein the hydrogenated edible vegetable oil is hydrogenated natural peanut oil.

32. A process as defined in claim 1 wherein the stabilizer employed is a glyceride partial ester.

33. A process as defined in claim 3 wherein the stabilizer employed in providing the stabilized peanut butter is a glyceride partial ester.

34. A process as defined in claim 5 wherein the stabilizer employed is a glyceride partial ester.

35. A process as defined in claim 1 wherein the stabilizer employed is an isomerized vegetable oil.

36. A process as defined in claim 3 wherein the stabilizer employed in providing the stabilized peanut butter is an isomerized vegetable oil.

37. A process as defined in claim 5 wherein the stabilizer employed is an isomerized vegetable oil.

References Cited in the file of this patent

UNITED STATES PATENTS

| Number | Name | Date |
|---|---|---|
| 1,395,934 | Stockton | Nov. 1, 1921 |
| 1,921,275 | Werner | Aug. 8, 1933 |
| 2,447,387 | Avera et al. | Aug. 17, 1948 |
| 2,552,925 | Avera | May 15, 1951 |